United States Patent Office 2,746,942
Patented May 22, 1956

2,746,942

ESTERS OF CO-POLYMERS OF AN UNSATURATED FATTY ACID WITH A VINYL AROMATIC COMPOUND AND AN ALKOXY POLYSILOXANE

James H. Sample, Chicago, Ill., and Robert A. Sturges, Solon, Ohio, assignors to The Sherwin-Williams Company, Cleveland, Ohio, a corporation of Ohio No Drawing. Application September 9, 1952, Serial No. 308,688

26 Claims. (Cl. 260—23)

This invention relates, as indicated, to certain novel esters of reactive polyorganosiloxanes, and more particularly to the esters resulting when a co-polymer of an unsaturated fatty acid with a vinyl aromatic compound is reacted with an alkoxy polysiloxane.

Derivatives of the polyorganosiloxanes which are useful in certain types of coating compositions are known to the art. These compounds are characterized by resistance to heat for prolonged periods as well as great water resistance and acid resistance. Examples of such derivatives may be found in the patent to Doyle et al. 2,587,295 dated February 26, 1952 and the patent to Goodwin et al. 2,584,343 dated February 5, 1952. Both of these patents relate to certain types of alkyds made from alkoxy polyorganosiloxanes among other materials, and illustrate their utility in various coating vehicles.

We have discovered a modified derivative of the reactive polyorganosiloxanes which also demonstrates great utility as a resinous component of paints and varnishes and particularly as the vehicle in baking enamels which are subject to prolonged exposure at elevated temperatures. The films which are obtained from the compositions of the present invention are highly flexible and extremely tough to abrasion and impact. They also possess the characteristics imparted by the silicone portion of the resin, namely, water resistance and acid and alkali resistance. Some of the prior art derivatives of the alkoxy polyorganosiloxanes, while demonstrating improved resistance to acid solutions, are nevertheless attacked by alkalies. The compositions of the present invention, on the contrary, show improved resistance to alkalies as well as acids and water. Another characteristic of the compounds of the present invention is that the less expensive mineral spirits solvent may be employed in lieu of part and in some cases in lieu of all of the more expensive aromatic hydrocarbon solvents normally employed in connection with the alkoxy polyorganosiloxane derivatives.

It is a principal object of this invention, therefore, to provide a class of novel resinous derivatives of the reactive polyorganosiloxanes.

Another object of this invention is to provide a resinous derivative of the alkoxy polyorganosiloxane which is characterized by improved resistance to alkali.

Still another object of this invention is to provide certain resinous derivatives of alkoxy polyorganosiloxanes of improved solubility in mineral spirits.

Another object of this invention is to provide novel resinous derivatives of alkoxy polyorganosiloxanes which are particularly adaptable for use in baking vehicles and which are further characterized by improved resistance to elevated temperatures over prolonged periods.

Other objects will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, therefore, our invention is the provision of a novel resinous derivative of a reactive polysiloxane formed from (a) an interpolymer of an unsaturated monocarboxylic fatty acid and a monovinyl aromatic compound,
(b) a polyhydric alcohol, and
(c) a reactive polyorganosiloxane selected from the group consisting of alkoxy polyorganosiloxanes and alkoxy polyorganosiloxanes in which at least one alkoxy radicle has been replaced with halogen It becomes convenient to consider each one of the several components individually thereafter providing certain illustrative specific examples illustrating the mode of compounding these resins.

A. THE INTERPOLYMERS OF AN UNSATURATED FATTY ACID AND A MONOVINYL AROMATIC COMPOUND

An essential characterizing member of the novel compositions of this invention is an interpolymer of a polymerizable unsaturated monomer and an unsaturated fatty acid. These acidic interpolymers, or acid reacting analogues thereof are substantially reacted with the alkoxy polyorganosiloxanes and polyhydric alcohols above referred to to produce the novel compositions of this invention.

1. *The polymerizable unsaturates.*—The polymerizable unsaturated materials useful in accordance herewith are generally mono-olefinic compounds of relatively low molecular weight, e. g., less than 250, which materials are capable of undergoing polymerization, i. e., one molecule of the material combining with another molecule or molecules of the same material, the polymer being characterized by a recurring structural unit, as distinguished from an interpolymer wherein two or more different molecules interact to form high molecular weight materials of indefinite structure. Thus the term "polymerizable" as used herein is intended to mean the property of these vinyl or ethylenically unsaturated monomers to react with themselves under appropriate conditions to yield polymers characterized by recurring structural units. These unsaturated materials are generally characterized by the group $CH_2=C<$ and for convenience may be referred to as vinyl monomers. Industrially important examples of the vinyl monomers contemplated for use in accordance with this invention include the following:

Table I

Vinyl monomers
    Aromatic hydrocarbons
        Styrene
        Alpha methyl styrene
        Para methyl styrene
        Alpha, para dimethyl styrene
        Divinyl benzene
        Vinyl naphthalene
        Acenaphthylene
        Vinyl toluene
    Aromatic halides, e. g.,
        Para chlorostyrene
        Para flurostyrene
        Para trichloromethyl styrene
        2,5-dichlorostyrene
    Miscellaneous vinyl monomers, e. g., para methoxy styrene Mixtures of the foregoing materials, for example, styrene and alpha methyl styrene may also be employed. In the preferred embodiments of this invention, the vinyl aromatic hydrocarbons, e. g., styrene and vinyl toluene are used.

2. *The unsaturated fatty acids.*—The unsaturated aliphatic acids useful in accordance herewith include a wide range of materials which are characterized in that they are reactive with vinyl monomers to form interpolymers of relatively high acid value. Such unsaturated aliphatic acids may contain from 3 to 24 carbon atoms. For most purposes and particularly for film-forming purposes, it is preferred to employ unsaturated aliphatic acids containing from 14 to 24 carbon atoms. The interpolymers of the higher molecular weight unsaturated aliphatic acids are usually of sufficiently low viscosity and functionality as to form desirable esters with the more highly functional alkoxy polysiloxanes. There are, of course, exceptions as with tung or oiticica oil acids which are more highly functional than linseed oil or soyabean oil fatty acids. The lower molecular weight unsaturated aliphatic acids, i. e., those containing from 3 to 13 carbon atoms are desirably used with lower functionality alkoxy polysiloxanes and/or lower viscosity alkoxy polysiloxanes. Specific examples of lower molecular weight unsaturated aliphatic acids include acrylic, methacrylic, vinyl-acetic, hydrosorbic, decenoic, undecylenic, sorbic acids, etc.

While such acids may be synthesized, it is convenient to employ unsaturated aliphatic acids derived from naturally occurring oils of animal, vegetable, or marine origin, and particularly those acids derived from drying oils and semi-drying oils. These acids may be either non-conjugated or conjugated, and may be employed as the monomer, dimer or trimer acid. Such preferred higher molecular weight acids have an iodine value of from about 120 to 425. Specific examples of unsaturated aliphatic acids useful in accordance herewith include:

*Table II*

| Aliphatic Acid | Empirical Formula | Natural Source |
|---|---|---|
| Hiragonic | $C_{16}H_{26}O_2$ | Japanese Sardine Oil. |
| Linoleic | $C_{18}H_{32}O_2$ | Cottonseed Oil. Soyabean Oil. Peanut Oil. Corn Oil. Sunflower Seed. Poppy Seed. Linseed Oil. Perilla. Sesame. |
| Iso-linoleic | $C_{18}H_{32}O_2$ | Castor Oil (dehydrated). |
| Linolenic | $C_{18}H_{30}O_2$ | Castor Oil (dehydrated). Linseed. Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e. g., menhaden. |
| Scoliodonic | $C_{24}H_{38}O_2$ | Marine animal oils. |
| Nisinic | $C_{24}H_{36}O_2$ | Do. |
| Tariric | $C_{18}H_{32}O_2$ | Seed Fat. |
| Licanic | $C_{18}H_{28}O_3$ | Oiticica oil. |
| Abietic | $C_{20}H_{30}O_2$ | Rosin Tall Oil. |

Natural oils of the drying or semi-drying types, as exemplified above, are generally mixtures of glycerides of two or more of the acids named above together with other glycerides, e. g., glyceryl oleate, glyceryl stearate and miscellaneous ingredients, e. g., phosphatides. Procedures for producing mixed acids of such oils are well known, e. g., "splitting" and such commercial acids are a preferred starting material. Thus there may be employed dehydrated castor oil fatty acids; linseed oil fatty acids, soya-bean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoid acids of the conjugated, non-conjugated, or mixed conjugated-non-conjugated types may be used. In the preparation of coating composition vehicles, the drying oil fatty acids, and particularly the vegetable drying oil fatty acids are preferred.

3. *Interpolymerization of polymerizable vinyl monomers and unsaturated fatty acids.*—A wide variety of interpolymers of polymerizable vinyl monomers and unsaturated aliphatic (or cycloaliphatic) acids may be produced by admixing the vinyl monomer and the acid in the presence of or absence of solvents and/or diluents, and employing a suitable catalyst material, which may be a substance such as benzoyl peroxide, di-t-butyl peroxide; sulphur, $SO_2$, etc., or a mixture of substances such as dodecyl mercaptan-benzoyl peroxide, etc., otherwise known as a redox catalyst. The terms "co-polymer" and "interpolymer" are used herein interchangeably. By the term "interpolymer" is meant the reaction product of two or more substances to yield a complex product having properties different from either material polymerized by itself. While it is not intended to be limited by theory, it is believed that the interpolymerization of the acid and the vinyl monomer progresses at a sufficient rate to provide a common or mutual solvent for other polymeric molecules which may be preponderantly polymerized vinyl monomer or preponderantly acid polymers. These terms are indicative of complex high molecular weight compositions which result from interaction between unlike molecules and homopolymerization between like molecules, reactions leading to these ends occurring simultaneously when two or more reactive compounds of the nature of those herein described are conditioned by proper temperatures, pressures and catalysts to react with each other and together form clear single phase homogeneous reaction products. The terms should not be understood to infer complete reaction in specific ratios between the individual reactant molecules to form repeated congruent geometric structures.

In the production of the interpolymers, it has been found that useful materials may contain from 5% to 75% by weight of the vinyl monomer and from 95% to 25% by weight of the unsaturated acid. The reaction may be carried out under reflux, the temperature being largely determined by the solvent and/or vinyl monomer present, or at a fixed temperature when the vinyl monomer is added stepwise, continuously or injected under the surface of the reaction mass. In general, for the non-conjugated fatty acids, the reaction temperature will be in the range of from about 120° F. to 550° F., and preferably between about 150° F. and 475° F. The amount of catalyst if employed will vary somewhat depending on the nature thereof. In the following table useful ranges of various types of catalysts for the interpolymerization reaction are provided.

*Table III*

| Peroxides: | Catalytic amount |
|---|---|
| Hydrogen peroxide (30%) | 1% to 5% |
| Benzoyl peroxide | .05% to 3% |
| t-butyl hydroperoxide | .1% to 3% |
| Di-t-butyl peroxide | .1% to 3% |
| Acetyl peroxide 30% in dimethyl phthalate | .3% to 5% |
| Clays: | |
| Fuller's earth | 1% to 10% |
| Sulphur catalysts: | |
| Sulphur | 1% to 2.5% |
| $SO_2$ | Gas bubbled in slowly |
| Halide catalysts: | |
| Stannic chloride | .1% to 5% |
| Boron fluoride (hydrated) | .1% to 5% |

It is frequently desirable to provide an inert atmosphere in carrying out these reactions, and nitrogen or carbon dioxide bubbled through the reaction mass undergoing interpolymerization is satisfactory for this purpose.

4. *Specific illustrative examples.*—The following interpolymers are made in glass equipment in laboratory batches, and the parts given for the batch ingredients are parts by weight, unless otherwise indicated. Standard ground glass, three neck glass flasks equipped with condenser, agitator, and separatory funnel for adding the vinyl monomer and a perforated glass tube by means of which gases could be directed through the batch, and a thermometer, were employed.

EXAMPLE A-1

An interpolymer was produced from linseed oil fatty acids and styrene utilizing 1200 parts of the unsaturated acids and 1200 parts of the vinyl monomer. The acids were weighed into the flask and heated to 400° F. under a $CO_2$ blanket. After the temperature reached 400° F., the $CO_2$ is switched to $SO_2$ which continues to bubble through the hot oil acids.

1200 parts of styrene and 0.240 part of benzidine were blended together and added slowly over a 14 hour period, the temperature being held at 400° F. and the slow introduction of $SO_2$ maintained. Thereafter, the $SO_2$ was discontinued, but the temperature maintained for an additional hour. The resultant oil acids-styrene interpolymer was clear, had an acid value of 116 and a viscosity of X.

The combined oxidation and reduction catalyst $SO_2$—benzidene is an example of a redox catalyst.

EXAMPLE A-2

600 parts of dehydrated castor oil fatty acids, 200 parts of styrene, 2 parts of dodecyl mercaptan and 5 parts of benzoyl peroxide were mixed and heated to reflux and maintained for 6 hours. At the end of this time the styrenated fatty acids had a viscosity of about S (Gardner) and the product was clear and homogeneous. The product had an acid number of 120.

EXAMPLE A-3

2400 parts of soya fatty acids were placed in a flask and carbon dioxide admitted to displace the air. The temperature of the oil was raised to 425° F. and $SO_2$ blown in slowly. Over a period of 4 hours, 600 parts of styrene were added. The temperature was held at 425° F. for an additional hour during which time the addition of $SO_2$ was stopped and carbon dioxide again vigorously blown through the reaction mass to remove unreacted styrene. No solvent was used in the production of this styrenated fatty acid.

The resulting product had a B to C (Gardner) viscosity, a color of 8 (Gardner-Holdt) and an acid value of 155.

EXAMPLE A-4

2400 parts of soya fatty acids were reacted with 1026 parts of styrene in the same manner as given in Example A-3. This product had a viscosity of from D to E, a color of 9 and an acid value of 142. This product was somewhat cloudy, due, perhaps, to the too rapid addition of styrene to the reaction.

EXAMPLE A-5

The conditions of Example A-4 were repeated exactly with the exception that instead of adding the styrene in a period of 4 hours, 6 hours for such addition was used. The resulting product was not cloudy, had a viscosity of from E to F, a color of 8 and an acid value of 136. 2933 parts of product were recovered.

EXAMPLE A-6

Following the same procedure and using the same materials as in Example A-5, equal parts of styrene and soya bean fatty acids were reacted. The addition time in this case for the styrene was 14 hours. The resulting product was a clear homogeneous liquid having a viscosity of from X to Y, a color of 11 and an acid value of 103. 2813 parts of product were recovered.

EXAMPLE A-7

2400 parts of linseed oil fatty acids and 600 parts of styrene were reacted following the same procedure used in Example A-3. The time required for addition of styrene was 4 hours.

The resultant product had a viscosity of less than A (Gardner), a color of 6, and an acid value of 160. The yield was 2950 parts.

EXAMPLE A-8

Equal parts of linseed fatty acid and styrene were reacted following the sulphur dioxide procedure given above in Example A-3. The temperature of reaction was 425° F. and the total time during which the styrene was added was 14 hours. The resultant product had a viscosity of $Z_2$ to $Z_3$, a color of from 9 to 10 and an acid value of 97.6. Of 3000 parts of starting materials, 2883 parts of product were recovered.

EXAMPLE A-9

2400 parts of linseed oil fatty acids and 680 parts of vinyl toluene were reacted following the sulphur dioxide procedure at a temperature of 425° F., the vinyl toluene addition requiring a period of 4.25 hours. 3042 parts of product having a viscosity of less than A, a color of 7 and an acid value of 157 were recovered.

EXAMPLE A-10

1500 parts of linseed fatty acids and 1700 parts of vinyl toluene were reacted following the sulphur dioxide catalyzed procedure at a temperature of 425° F., the addition of vinyl toluene covering a period of 14 hours. The yield was 3114 parts of product from 3200 parts of starting material. This product had a viscosity of from Z to $Z_1$, a color of 8 and an acid value of 91.7.

EXAMPLE A-11

2400 parts of soya fatty acids and 680 parts of vinyl toluene were reacted following the $SO_2$ procedure given above, the addition of vinyl toluene covering a period of 4.25 hours. 3,034 parts of a total of 3,080 parts were recovered as a product having a viscosity of C to D, a color of 11 and an acid value of 155.

EXAMPLE A-12

2100 parts of soya fatty acids and 1020 parts of vinyl toluene were reacted following the $SO_2$ procedure given above, the addition time for vinyl toluene covering 6.5 hours. 3,073 parts of a product having a viscosity of I to J, a color of 10 and an acid value of 128.5 were recovered.

EXAMPLE A-13

1500 parts of soya fatty acids and 1700 parts of vinyl toluene were reacted following the $SO_2$ catalyzed procedure given above, the addition of vinyl toluene requiring 14 hours. 3148 parts of product having a viscosity of $Z_1$ to $Z_2$, a color of 10, and an acid value of 90.4 were recovered.

EXAMPLE A-14

2400 parts of Isoline fatty acids, 600 parts of styrene and 12 parts of ditertiary butyl peroxide were reacted under a $CO_2$ blanket. The acids are placed in a flask and heated to 350° F. over a period of 2½ hours. The styrene, having dissolved therein 8 parts of the peroxide, is added to the hot acids. The temperature is then raised to 440° F. over a period of 1 hour. While holding at the temperature of 440° F., in each successive half-hour for a total of five times, ½ part of the remaining peroxide is added. After these additions, in the last ½ hour .75 part of peroxide is added. At the end of the last one-half hour, the final .75 part of the peroxide is introduced. Thereafter, the batch is held for a period of ½ hour at 450° F. 2912 parts of product from a total of 3,012 parts of starting materials were obtained. This product had a viscosity of from I to J, a color of 10 and an acid value of 152.

EXAMPLE A-15

2100 parts of Isoline fatty acids (fatty acids of dehydrated castor oil of G-H Gardner viscosity), 900 parts of styrene and 18 parts of ditertiary butyl peroxide were copolymerized following the same procedure as given in Example A-14. The temperature of reaction was 450° F. and the addition of styrene covered a period of 3 hours. ⅔ of the ditertiary butyl peroxide were admixed with the styrene and added. The remaining ⅓ of the ditertiary butyl peroxide was added in aliquot portions of ⅔ of a part at the end of each ½ hour while holding at the reaction temperature of 450° F. A total of 9 such peroxide additions were made. 2966 parts of product were obtained from a total of 3,018 parts of starting materials. The resulting product had a viscosity of from S to T, a color of 6 and an acid value of 137.

EXAMPLE A-16

1800 parts of Isoline fatty acids, 1200 parts of styrene and 24 parts of ditertiary butyl peroxide were co-polymerized following the same procedure as given in Example A-15. 4½ hours were required to add the styrene-peroxide mixture, ⅔ of the total amount of peroxide being admixed with the styrene prior to addition. The remaining 8 parts of ditertiary butyl peroxide were added, 1 part every ½ hour for a total of 8 additions. The temperature of reaction in this case was 440° F., 2934 parts of product were recovered from an initial material weight of 3024 parts. This product had a viscosity of 2 minutes and 33 seconds, a color of 7 and an acid value of 120.5.

EXAMPLE A-17

2400 parts of Isoline fatty acids, 680 parts of vinyl toluene, and 12 parts of ditertiary butyl peroxide were co-polymerized following exactly the same procedure as specified in Examples A-14. In this case, 3,049 parts of product were obtained from an initial weight of starting materials of 3,092 parts. The material had a viscosity of J, a color of 6 and an acid value of 160.

EXAMPLE A-18

2400 parts of tung oil fatty acids, 340 parts of vinyl toluene and 9 parts of ditertiary butyl peroxide were reacted following the same procedure set forth in Example A-17. 2659 parts of product were obtained from a total of 2,749 parts starting materials. This product had a viscosity of N, a color of 6 and an acid value of 170.

EXAMPLE A-19

2400 parts of soya bean fatty acids and 780 parts of paramethoxy styrene were reacted in accordance with the procedure set forth in Example A-3. 3,097 parts of product were obtained from an initial starting weight of 3180 parts, and the product had a viscosity of D, a color of 8, and an acid value of 139.

The foregoing examples of methods for preparing the interpolymers of vinyl monomers and aliphatic acids are illustrative of a process for making such materials. Of course any suitable method for producing acidic vinylated interpolymers of the type described may be employed. For example, solvents, e. g., xylol, may be used, and the reaction carried out at much reduced temperatures, i. e., in the neighborhood of 150-250° F. or under reflux. Various methods of introducing the vinyl monomer into the reaction mass may be employed. Several types of catalysts for this reaction have been demonstrated in the previous examples although others not specifically illustrated may be used in place of those mentioned above.

While the fatty acids specifically exemplified above are acids of varying purity derived from naturally occurring drying oils, pure synthetically produced acids of higher or lower molecular weight may be substituted for those manufactured. Although the drying oil fatty acids impart highly desirable characteristics to the final product, it is to be understood that interpolymerizable fatty acids not possessed of drying characteristics may also be employed to produce useful products.

The viscosities given in the previous examples range all the way from less than A on the Gardner scale to as high as $Z_5$. Useful end products may be produced from such styrenated vehicles throughout the range of viscosities. Since color is important in the manufacture of vehicles, although not necessarily so in connection with the production of other products, it is desirable to maintain the color as low as possible where the end product is to be used for such a purpose.

Since these intermediates are to be used in a further esterification of ether resins which contain hydroxyl or reactive groups capable of forming an ester with such acidic materials, it is desirable that the acid number of the final product be relatively high, i. e., in the neighborhood of from about 80 to about 190.

*B. The polyhydric alcohols.*—One of the essential components of the reaction products of the present invention is a polyhydric alcohol, that is an aliphatic polyhydroxy compound containing 2 or more hydroxy radicles. Those which may be used in accordance with this invention include, for example, ethylene glycol, diethylene glycol, propylene glycol, trimethylene glycol, glycerine, trimethylol propane, pentaerythritol, polyallyl alcohol, sorbitol, mannitol, etc. In the preferred cases, polyhydric alcohols containing 3 or more hydroxy radicles are employed.

*C. The alkoxy polyorganosiloxanes.*—The alkoxy polyorganosiloxanes suitable for use in accordance with this invention are characterized by the presence therein of the following structure:

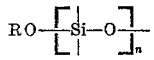

wherein R is an alkyl radicle containing from 1 to 4 carbon atoms and $n$ is at least 2. The free valences of silicon may be satisfied with alkyl radicles of from 1 to 4 carbon atoms or aryl radicles such as phenyl. In certain instances both an alkyl radicle such as methyl, ethyl, propyl, isopropyl, butyl, isobutyl, etc. and an aryl radicle such as phenyl may be attached to the same silicon atom.

A particularly useful class of compounds in accordance with this invention are the alkoxy end blocked siloxanes having the average general formula:

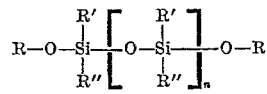

wherein R represents an alkyl radicle containing from 1 to 4 carbon atoms, R' and R'' each represent the same or different monovalent hydrocarbon radicles which may be alkyl or aryl, and $n$ is at least 1. Alkoxy end blocked siloxanes of this particular type are fully disclosed in the patent to Hunter et al. 2,415,389 dated December 4, 1947.

Instead of the alkoxy end blocked siloxanes wherein the terminal silicon atoms are characterized by one alkoxy group attached thereto, similar compounds containing end blocking alkoxy groups but additionally characterized by the presence therein of at least one other alkoxy group attached to an intermediate silicon atom may also be employed in producing the compounds of this invention. A specific example of a commercially available compound of this latter type is dimethyl triphenyl trimethoxy trisiloxane having the following average formula:

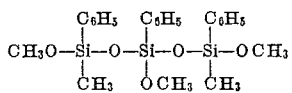

(dimethyltriphenyltrimethoxytrisiloxane)

In commercial mixtures containing this material, some molecules will be larger and others smaller.

Specific examples of alkoxy polyorganosiloxanes useful in accordance with this invention include the following:

Diethoxy tetramethyl disiloxane—

$$C_2H_5O((CH_3)_2SiO)_2C_2H_5$$

Diethoxyhexamethyl trisiloxane—

$$C_2H_5O((CH_3)_2SiO)_3C_2H_5$$

Diethoxyoctamethyl tetrasiloxane—

$$C_2H_5O((CH_3)_2SiO)_4C_2H_5$$

Diethoxydecamethyl pentasiloxane—

$$C_2H_5O((CH_3)_2SiO)_5C_2H_5$$

Diethoxydodecamethyl hexasiloxane—

$$C_2H_5O((CH_3)_2SiO)_6C_2H_5$$

Tetraethoxy dimethyl disiloxane—

$$C_2H_5O(Si(CH_3)OC_2H_5O)_2C_2H_5$$

In the foregoing specific examples, the ethoxy radicals may be replaced with methoxy, propoxy, iso-propoxy, butoxy, iso-butoxy, etc. Alkoxy radicals and one or more of the methyl radicals may be replaced with an alkyl radicle or with an aryl radicle to provide additional examples of materials which may be used in accordance with this invention.

It has been found that the methoxy groups directly attached to silicon are readily reactive with active hydroxyl groups of carboxylic acids and alcohols to produce complex resinous materials useful as vehicles for coating compositions. These reactions proceed with the elimination of alcohol corresponding to the alkoxy group which is being replaced.

It should also be pointed out that similar resins may be made from polyorganosiloxanes which have halogen atoms, e. g., chlorine atoms replacing one or more alkoxy groups in the foregoing general formula and specific examples. Specifically, dimethyltriphenyltrichlorotrisiloxane, trimethyltriphenyl dichlorotrisiloxane, etc., may be employed herein. In such case, the by-product of the reaction is HCl instead of methyl or ethyl alcohol.

It becomes convenient at this point therefore, to illustrate the mode of compounding the resinous compositions of this invention by giving illustrative examples. It is to be understood that these examples are for the purpose of illustrating a preferred manner of obtaining the resinous materials of this invention, and the invention is not to be limited to the precise methods or compositions shown in these examples.

EXAMPLE B–1

408 grams of a styrenated dehydrated castor fatty acid co-polymer produced in accordance with Example A–15 were heated to 300° F. and 100 grams of pentaerythritol added. The mixture was heated to 375° F. and in four hours and twenty minutes at an acid value of 13.6 the mixture was cooled to 300° F. At this point 316 grams of dimethyltriphenyltrimethoxytrisiloxane were added and the mixture held at 300° F. for three hours while methanol distilled off. The temperature was gradually raised to 400° F. and thinned to 75% solids content with xylol when it reached a 20″ cure. This required 2.5 hours from the temperature of 350° F. or 3.5 hours from the temperature of 300° F. 1,000 grams of product, 75% solids in xylol were obtained having a viscosity of from X to Y, a color on the Gardner-Holdt scale of about 5, an acid value of 4.8 and a cure of 15 seconds.

EXAMPLE B–2

223 gms. of the co-polymer of vinyl toluene and soya fatty acids produced in accordance with Example A–13, 24 grams of glycerine, and 131 grams of a polyepoxy ether resin produced from di-para hydroxy phenyl dimethyl methane and epichlorohydrin (Epon 1004) were reacted together until an acid value of 9.7 was reached. 158 grams of dimethyl triphenyl trimethoxy trisiloxane were added and finally the batch thinned with methyl isobutyl ketone to 75% solids. The reaction procedure was essentially the same as in Example B–1. 688 grams of 75% total solid material were recovered having a viscosity of 0 on the Gardner-Holdt scale, a color of about 9 and an acid value of 4.4. This material cured in 2 seconds.

EXAMPLE B–3

223 grams of a 1:1 styrene-soya fatty acid co-polymer produced in accordance with Example A–6 were heated under a $CO_2$ blanket to 300° F. 52 parts of pentaerythritol were then added and the mixture held at 400° F. approximately 2.5 hours to an acid value of 1.3. The batch was then cooled to 350° F., and 153 grams of dimethyl triphenyl trimethoxy trisiloxane were then added and the mixture held at 460° F. for 3.66 hours to an acid value of 1.4. Resulting composition was thinned to 60% NVM with a mixture of equal parts of xylol and methyl isobutyl ketone. This product had a viscosity of less than A on the Gardner-Holdt scale, a color of 6 to 7, an acid value of 1.4, and a cure greater than 2 minutes.

EXAMPLE B–4

Following exactly the same procedure as given in Example B–3 above, 223 parts of a 1:1 styrene-linseed fatty acid co-polymer produced in accordance with Example A–8 above, 52 parts of pentaerythritol, and 158 parts of dimethyl triphenyl trimethoxy trisiloxane were reacted. The resulting product was thinned to 60% NVM with an equal portion mixture of xylol and methyl isobutyl ketone yielding a vehicle having the following characteristics: Viscosity of less than A on the Gardner-Holdt scale, color 6 to 7, acid value 2.7, and a cure of greater than 2 minutes.

EXAMPLE B–5

Following exactly the same procedure as set forth in Example B–3 above, 160 parts of a 3:7 styrene-soya fatty acid copolymer produced in accordance with Example A–5, 52 parts of pentaerythritol and 158 parts of dimethyl triphenyl trimethoxy trisiloxane were interacted. The resulting product was thinned to 60% NVM with a solvent consisting of an equal mixture of xylol and methyl isobutyl ketone. The resulting vehicle had the following characteristics: A viscosity of C–D on the Gardner-Holdt scale, a color of 6–7, an acid value of 2.6, and a cure of 107 seconds.

EXAMPLE B–6

Following the procedure set forth in Example B–3 above, 140 parts of a 1:4 styrene-soya fatty acid copolymer produced in accordance with Example A–3 above, 52 parts of pentaerythritol and 158 parts of dimethyl triphenyl trimethoxy trisiloxane were reacted. The resulting product was thinned to 60% NVM with a mixture of equal parts of xylol and methyl isobutyl ketone. The resulting vehicle had the following characteristics: A viscosity of A–B on the Gardner-Holdt scale, a color of 6–7, an acid value of 2.1 and a cure of 95 seconds.

EXAMPLE B–7

Following the procedure of Example B–3 above, 140 parts of a 1:4 vinyl toluene-linseed fatty acid co-polymer produced in accordance with Example A–9 above, 52 parts of pentaerythritol and 158 parts of dimethyl triphenyl trimethoxy trisiloxane were reacted. The resulting product was cut to 50% NVM in a xylol-methyl isobutyl ketone mixture (50–50). The resulting vehicle had the following characteristics: A viscosity of less than A on the Gardner-Holdt scale, a color of 6–7, an acid value of 2.0 and a cure of 90 seconds.

EXAMPLE B–8

Following the same procedure as set forth in Example B–7 above, 140 parts of a 1:4 vinyl toluene-soya fatty acid vehicle produced in accordance with Example A–11 above, 52 parts of pentaerythritol, and 158 parts of dimethyl triphenyl trimethoxy trisiloxane were reacted. Resulting composition was diluted to 50% solids in a 50–50 mixture of xylol and methyl isobutyl ketone. Resulting vehicle had the following characteristics: A viscosity of less than A, a color of 6–7, an acid value of 0.9, and a cure greater than 2 minutes.

EXAMPLE B–9

The product of Example B–5 was reproduced in this example substituting, however, an equal amount of a 3:7 vinyl toluene-soya fatty acid co-polymer produced in accordance with Example A–12 for the 3:7 styrene-soya fatty acid co-polymer of Example B–5. The resulting vehicle had the following characteristics: A viscosity of B on the Gardner-Holdt scale, a color of 7–8, an acid value of 4.8 and a cure greater than 2 minutes.

EXAMPLE B–10

The product of Example B–7 was reproduced substituting a 1:4 styrene-linseed fatty acid co-polymer produced in accordance with Example A–7 for the 1:4 vinyl toluene linseed fatty acid copolymer of Example B–7. The resulting vehicle was cut to 60% NVM in a 50–50 mixture of xylol and methyl isobutyl ketone. The resulting vehicle had the following characteristics: Viscosity A–B, Gardner-Holdt scale, color 6–7, acid value 3.2, and cure 68 seconds.

EXAMPLE B–11

Using the proportions set forth in Example B–7 above, all of the ingredients were the same except that the co-polymer of Example B–7 was replaced in toto with a 1:4 styrene-isoline fatty acid combination produced in accordance with Example A–14. This product was then cut to 60% solids in a 50–50 mixture of xylol and methyl isobutyl ketone. The resulting vehicle had the following characteristics: Viscosity G–H on the Gardner-Holdt scale, color 7–8, acid value 2.6, and cure 10 seconds.

EXAMPLE B–12

Using the proportions set forth in Example B–7 above, but replacing the co-polymer with an equal amount of a 1:4 vinyl toluene-isoline fatty acid vehicle produced in accordance with Example A–17, and diluting to 60% solids in a 50–50 xylol-methyl isobutyl ketone mixture, the resulting vehicle had the following characteristics: Viscosity G–H on the Gardner-Holdt scale, color 3–4, acid value 2.4, and cure 27 seconds.

EXAMPLE B–13

223 parts of a 50–50 vinyl toluene-soya fatty acid co-polymer produced in accordance with Example A–13, 48 parts of glycerine, and 158 parts of dimethyl triphenyl trimethoxy trisiloxane were reacted in accordance with the procedure of Example B–3. This material was cut with xylene to 75% NVM. Resulting product had a viscosity of K–L on the Gardner-Holdt scale, a color of 9, an acid value of 3.8, and a cure greater than 2 minutes.

While the foregoing examples will dry on exposure to air, best results are achieved when the vehicles are baked. The speed of air drying is comparatively slow, the set times being generally within one day, some examples becoming kraft and foil-free overnight, and others requiring a somewhat longer period. When these compositions are baked, the various films exhibited pencil hardness ranging from quite soft to 8–H. A series of test baking schedules were run and it was found that in general best results are obtained with the foregoing examples when the films are baked for a period of from 30 minutes to 60 minutes at temperatures of approximately 400° F. or higher. The products of Examples B–7 and B–13 were baked for 60 minutes at 400° F. The resulting films exhibited excellent hardness and resistance to alkali, acid, hot water and cold water. 16 hours spot tests were made on each of these baked films with maleic acid, acetic acid, citric acid, 95% ethyl alcohol, 7% iodine, and 1% sodium hydroxide. The only material showing any effect on the films were iodine and a very slight discoloration due to acetic acid. All other results were negative. The baked films from the composition of this invention show excellent resistance to elevated temperatures for prolonged periods.

With regard to the film-forming constituents of the compositions of this invention, that is, before reduction in mineral spirits or xylol, or other such solvent, the interpolymer of the monovinyl aromatic compound and the unsaturated fatty acid is present in general in amounts ranging from about 40% to about 60%. The polyhydric alcohol is generally present in amounts ranging from about 10% to about 20%, and the reactive polyorganosiloxanes are generally present in amounts ranging from about 35% to about 50%, all percentages being on a weight basis.

As illustrated in Example B–2 above, the resinous compositions of this invention may be further modified by the introduction of additional resinous materials as, for example, the polyepoxy ether resins. The compositions of this invention may also be mixed with alkyd resins, oil-modified alkyds, drying oils, semi-drying oils, and the like to produce particular effects in the final film.

These examples illustrate preferred modes of formulating simple and complex resins from co-polymers of monovinyl aromatic compounds with fatty acids, polyhydric alcohols, and reactive polysiloxanes. Additional ingredients may be incorporated in these resins and variations may be made in the manner of interacting the several ingredients. The same processes as illustrated in the previous example have been found to be satisfactory for producing additional examples, and no purpose will be served by further multiplying the examples to show the use of different co-polymers or different alkyl polyorganosiloxanes since the procedure followed is essentially the same in each case.

Other modes of applying the principle of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. A resinous reaction product of a reactive polyorganosiloxane formed by heating (a) an interpolymer of an unsaturated monocarboxylic fatty acid and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radical has been replaced with halogen, the alkyl portion of said alkoxy group having from 1 to 4 carbon atoms therein.

2. A resinous reaction product of a reactive polyorganosiloxane formed by heating (a) an interpolymer of an unsaturated monocarboxylic fatty acid containing from 14 to 24 carbon atoms and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

3. A resinous reaction product of a reactive polyorganosiloxane formed by heating (a) an interpolymer of an unsaturated monocarboxylic fatty acid containing from 3 to 13 carbon atoms and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes and alkoxy polyorganosiloxanes in which at least 1 alkoxy radicle has been replaced with halogen, the alkyl portion of said alkoxy group having from 1 to 4 carbon atoms therein.

4. A resinous reaction product of a reactive polyorganosiloxane formed by heating (a) an interpolymer of an unsaturated fatty oil acid selected from the group consisting of drying oil fatty acids and semi-drying oil fatty acids and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

5. A resinous reaction product of a reactive polyorganosiloxane formed by heating (a) an interpolymer of an unsaturated vegetable oil fatty acid and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

6. A resinous reaction product of a reactive polyorganosiloxane formed by heating (a) an interpolymer of an unsaturated non-conjugated vegetable oil fatty acid and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

7. A resinous reaction product of a reactive polyorganosiloxane formed by heating (a) an interpolymer of linseed oil fatty acid and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

8. A resinous reaction product of a reactive polyorganosiloxane formed by heating (a) an interpolymer of dehydrated castor oil fatty acids and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

9. A resinous reaction product of a reactive polyorganosiloxane formed by heating (a) an interpolymer of soya bean oil fatty acids and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

10. A resinous reaction product of a reactive polyorganosiloxane formed by heating (a) an interpolymer of tung oil fatty acids and a monovinyl aromatic compound, (b) an aliphatic polyhydric alcohol, and after reacting (a) and (b), then introducing, (c) a reactive polyorganosiloxane selected from the group consisting of alkoxy polyorganosiloxanes, and alkoxy polyorganosiloxanes in which at least 1 alkoxy radicle has been replaced with halogen, the alkyl portion of said alkoxy group having from 1 to 4 carbon atoms therein.

11. A composition in accordance with claim 1 in which the monovinyl aromatic compound is present in an amount ranging from about 5% to about 75% by weight of the interpolymer.

12. A composition in accordance with claim 1 in which the monovinyl aromatic compound is a monovinyl aromatic hydrocarbon.

13. A composition in accordance with claim 1 in which the monovinyl aromatic compound is a halogen-substituted monovinyl aromatic hydrocarbon.

14. A composition in accordance with claim 1 in which the monovinyl aromatic compound is styrene.

15. A composition in accordance with claim 1 in which the monovinyl aromatic compound is vinyl toluene.

16. A composition in accordance with claim 1 in which the polyhydric alcohol is an aliphatic polyhydric alcohol containing at least 3 hydroxyl radicles.

17. A composition in accordance with claim 1 in which the polyhydric alcohol is glycerine.

18. A composition in accordance with claim 1 in which the polyhydric alcohol is pentaerythritol.

19. A composition in accordance with claim 1 in which the alkoxy polyorganosiloxane is an alkoxy end-blocked polyorganosiloxane having the average formula

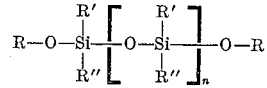

wherein R is an alkyl radicle containing from 1 to 4 carbon atoms, R' and R" are each selected from the group consisting of alkyl and aryl radicles, and n is at least 1.

20. A composition in accordance with claim 1 in which the alkoxy polyorganosiloxane is one having the following average structure

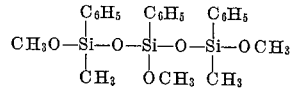

dimethyltriphenyltrimethoxytrisiloxane

21. A composition in accordance with claim 18 in which at least one of the RO- groups has been replaced by halogen.

22. A resinous reaction product of a reactive polyorganosiloxane formed by heating (a) from about 40% to about 60% by weight of an interpolymer of an unsaturated monocarboxylic fatty acid and a monovinyl aromatic compound, (b) from about 10% to about 20% by weight of an aliphatic polyhydric alcohol, and after reacting (a) and (b), then introducing, (c) from about 35% to about 50% by weight of a reactive polyorganosiloxane selected from the group consisting of alkoxy polyorganosiloxanes, and alkoxy polyorganosiloxanes in which at least 1 alkoxy radicle has been replaced with halogen, said alkyl portion of said alkoxy having from 1 to 4 carbon atoms therein.

23. A resinous reaction product of a reactive polyorganosiloxane formed by heating (a) from about 40% to about 60% by weight of an interpolymer of a vegetable drying oil fatty acid and a vinyl aromatic hydrocarbon, (b) from about 10% to about 20% by weight of glycerine, and after reacting (a) and (b), then introducing, (c) from about 35% to about 50% by weight of a reactive polyorganosiloxane having an average composition approximating dimethyl, triphenyl trimethoxy trisiloxane.

24. A resinous reaction product in accordance with claim 23 in which the interpolymer is an interpolymer of soya bean oil fatty acids and vinyl toluene.

25. A resinous reaction product in accordance with claim 23 in which the interpolymer is an interpolymer of linseed oil fatty acids and styrene.

26. A resinous reaction product in accordance with claim 22 in which the interpolymer is an interpolymer of linseed oil fatty acids and vinyl toluene, the polyhydric alcohol is pentaerythritol, and the reactive polysiloxane is one having an average compostion approximating dimethyl, triphenyl trimethoxy trisiloxane.

References Cited in the file of this patent

UNITED STATES PATENTS

| | | |
|---|---|---|
| 2,415,389 | Hunter et al. | Feb. 4, 1947 |
| 2,584,343 | Goodwin et al. | Feb. 5, 1952 |
| 2,587,295 | Doyle et al. | Feb. 26, 1952 |

FOREIGN PATENTS

| | | |
|---|---|---|
| 611,109 | Great Britain | Oct. 26, 1948 |

OTHER REFERENCES

Paint Oil and Chemical Review, Nov. 11, 1948, pages 49–51.